US011606392B2

(12) United States Patent
Biswas et al.

(10) Patent No.: US 11,606,392 B2
(45) Date of Patent: Mar. 14, 2023

(54) SYSTEM FOR TUNING A DEVICE HAVING SECURITY SOFTWARE FOR SECURITY AND PERFORMANCE

(71) Applicant: McAfee, LLC, San Jose, CA (US)

(72) Inventors: Shuborno Biswas, Waterloo (CA);
Junmin Qiu, Waterloo (CA);
Siddaraya B. Revashetti, Cupertino, CA (US)

(73) Assignee: McAfee, LLC, San Jose, CA (US)

( * ) Notice: Subject to any disclaimer, the term of this patent is extended or adjusted under 35 U.S.C. 154(b) by 236 days.

(21) Appl. No.: 16/887,956

(22) Filed: May 29, 2020

(65) Prior Publication Data

US 2021/0377312 A1  Dec. 2, 2021

(51) Int. Cl.
*H04L 9/40* (2022.01)
*H04L 41/0893* (2022.01)
*G06F 9/455* (2018.01)
*G06F 21/62* (2013.01)
*G06F 21/53* (2013.01)

(52) U.S. Cl.
CPC .......... *H04L 63/20* (2013.01); *G06F 9/45558* (2013.01); *G06F 21/53* (2013.01); *G06F 21/6218* (2013.01); *H04L 41/0893* (2013.01)

(58) Field of Classification Search
CPC . H04L 63/20; H04L 41/0893; G06F 9/45558; G06F 21/53; G06F 21/6218
USPC .......................................................... 726/22
See application file for complete search history.

(56) References Cited

U.S. PATENT DOCUMENTS

| | | | |
|---|---|---|---|
| 6,059,842 A | 5/2000 | Dumarot et al. | |
| 7,340,774 B2 | 3/2008 | Hursey et al. | |
| 7,555,621 B1 | 6/2009 | Pavlyushchik | |
| 7,784,054 B2 | 8/2010 | Monasterio | |
| 10,095,533 B1 | 10/2018 | Dravid et al. | |
| 11,042,660 B2* | 6/2021 | Zhang | G06F 16/2272 |
| 2007/0030833 A1 | 2/2007 | Pirzada et al. | |
| 2007/0234365 A1* | 10/2007 | Savit | G06F 9/505 718/104 |
| 2008/0082983 A1* | 4/2008 | Groetzner | G06F 9/5083 718/105 |
| 2009/0133031 A1 | 5/2009 | Inoue | |

(Continued)

FOREIGN PATENT DOCUMENTS

CN         105308923 A  *  2/2016  ............. G06F 21/51

OTHER PUBLICATIONS

Borelli et al. 2020 arXiv, "Architectural Software Patterns for the Development of IoT Smart Applications", pp. 1-29 (Year: 2020).*

(Continued)

*Primary Examiner* — Khalil Naghdali
(74) *Attorney, Agent, or Firm* — Patent Capital Group

(57) ABSTRACT

An apparatus, related devices and methods, having a memory element operable to store instructions; and a processor operable to execute the instructions, such that the apparatus is configured to determine, based on operating system workload demands, whether a high-demand application is running and, based on a determination that a high-demand application is running, apply an optimization policy that modifies a security application, wherein the optimization policy modification includes reducing a protection applied by the security application.

18 Claims, 8 Drawing Sheets

(56) References Cited

U.S. PATENT DOCUMENTS

| | | | |
|---|---|---|---|
| 2011/0209196 A1* | 8/2011 | Kennedy | H04L 63/101 726/1 |
| 2012/0136833 A1 | 5/2012 | Bartholomy et al. | |
| 2013/0254754 A1 | 9/2013 | Rajaraman | |

OTHER PUBLICATIONS

Uriarte et al., 2017 IEEE Access, "Expressive Policy-Based Access Control for Resource-Constrained Devices", pp. 15-46 (Year: 2017).*

* cited by examiner

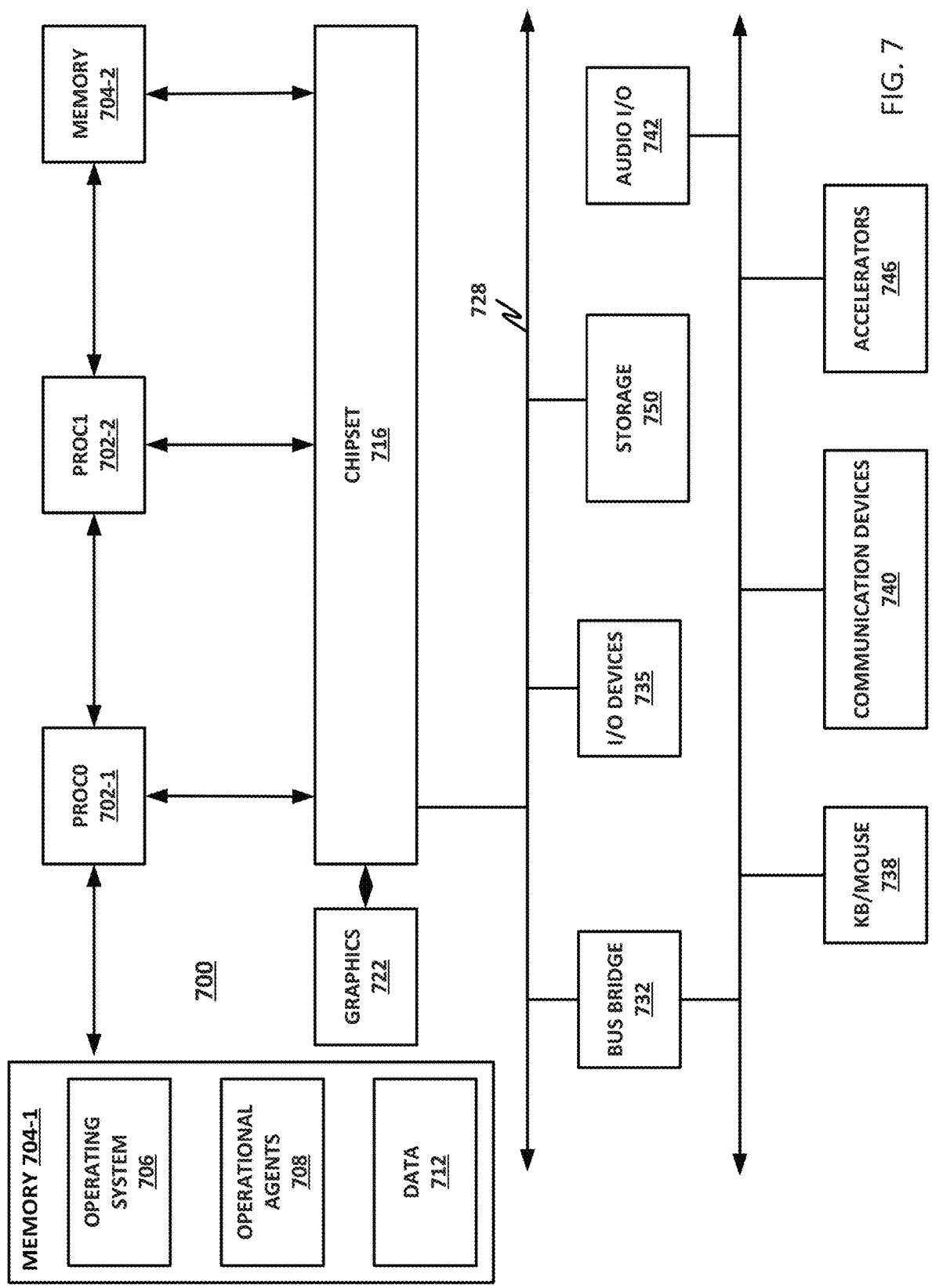

SYSTEM FOR TUNING A DEVICE HAVING SECURITY SOFTWARE FOR SECURITY AND PERFORMANCE

TECHNICAL FIELD

This disclosure relates in general to computer security and user space computing, more particularly, though not exclusively, to a system and method for reducing the impact of a security application on computer performance during heavy workload periods by optimizing computer software or hardware configurations.

BACKGROUND

The field of computer security has become increasingly important in today's society. In particular, web-based applications can provide a medium for exchanging data between different applications and different devices connected via computer networks. While the use of a network has transformed business and personal communications, it has also been used as a vehicle for malicious operators to gain unauthorized access to computers for inadvertent or malicious disclosure of sensitive information. Security applications, such as anti-malware software, provide protection, including real-time protection, for computers, and may require significant resources that slow system response times. A user may opt to disable key features or completely turn off the security application to increase system performance, which leaves the computer vulnerable to malicious attacks.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

FIG. 7 is a block diagram of selected elements of a hardware platform.

DETAILED DESCRIPTION

Figure 1:
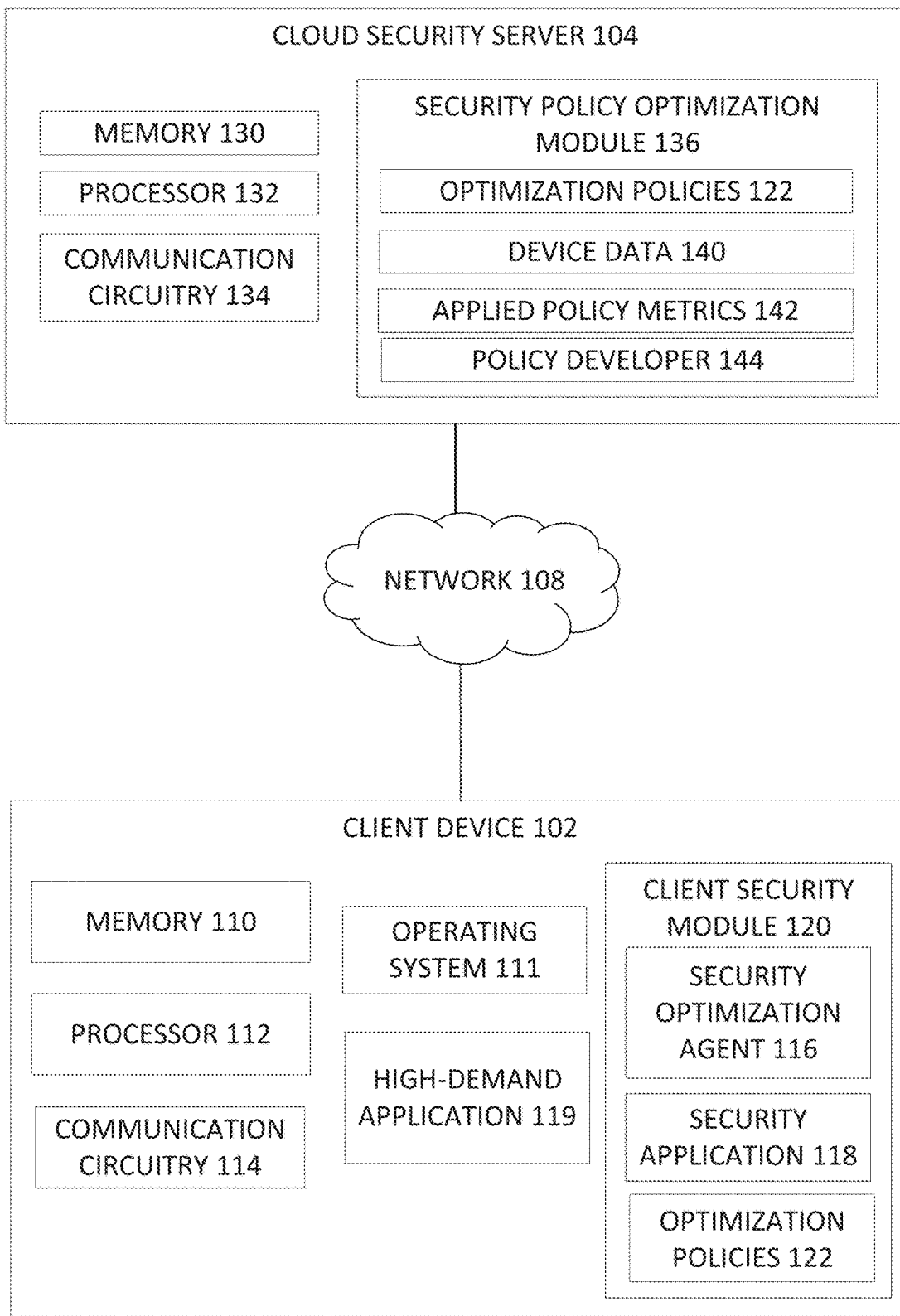
FIG. 1 is a simplified block diagram of an example security system for tuning a computing system for security and performance, in accordance with an embodiment of the present disclosure.

An apparatus, including systems and methods, for tuning a computing system for security and performance is disclosed herein. For example, in some embodiments, an apparatus having a memory element operable to store instructions; and a processor operable to execute the instructions, is configured to determine, based on operating system workload demands, whether a high-demand application is running and, based on a determination that a high-demand application is running, apply an optimization policy that modifies a security application, wherein the optimization policy modification includes reducing a protection applied by the security application. In some embodiments, an apparatus having a memory element operable to store instructions; and a processor operable to execute the instructions, is further configured to determine, based on operating system workload demands, that the high-demand application is not running, and, based on a determination that the high-demand application is not running, apply a second optimization policy that modifies the security application, wherein the second optimization policy modification includes restoring the protection applied by the security application that was reduced by the first optimization policy.

When a user is running software that has high-demand workloads, such as a PC Gaming application, the user desires optimal software performance. The high-demand software expects to be assigned maximum priority by the operating system and allocated maximum resources from the associated hardware in order to achieve optimal software performance. In some instances, the high-demand software competes for resources with other software, including software that is known to slow computer performance, which may cause performance degradation. Examples of performance degradation may include a frozen display, delays in registering inputs, and slow response time in rendering images, among others. A user is likely to have little tolerance for slow performing software. In order to prevent the operating system from allocating resources to competing software, a user may deactivate or remove the competing software. Security software is known to slow computer performance, and if deactivated or deleted exposes the computer to malicious attacks. Another approach to boosting computer performance of a high-demand software, such as gaming software, is by installing an operating system with features particular to gaming software, such as Microsoft® Windows 10, that enable turning on and off "gaming mode." Such operating system features simply prioritize the gaming software and suppress user interface (UI) elements. Still another approach is purchasing an add-on Gaming Anti-Virus Product, such as Webroot®. Such add-on software suppresses particular features without identifying specific performance benefits, and in some instances, performance benefits are promised by a money-back guarantee and not by an actual performance improvement. A security system and method for protecting a computer against malicious attacks while reducing the impact of a security application on computer performance may be desired.

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The drawings are not necessarily to scale.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The meaning of "a," "an," and "the" include plural references. The meaning of "in" includes "in" and "on." When used to describe a range of dimensions, the phrase "between X and Y" represents a range that includes X and Y. For convenience, the phrase "FIG. 2" may be used to refer to the collection of drawings of FIGS. 2A-2B, etc. Although certain elements may be referred to in the singular herein, such elements may include multiple sub-elements. As used herein, the terms "security," "cyber security," "anti-malware," and "anti-virus" may be used interchangeably, and the terms "software," "application," and "program" may be used interchangeably. For example, the terms "anti-malware program" and "security application," and similar variations, may be used interchangeably.

FIG. 1 is a simplified block diagram of a security system 100 that enables tuning a computing system for security and performance, in accordance with an embodiment of the present disclosure. As illustrated in FIG. 1, an embodiment of security system 100 may include a client device 102, a cloud security server 104, and network 108. The client device 102 may include memory 110, a processor 112, communication circuitry 114, an operating system 111, a high-demand application 119, and a client security module 120 that includes a security optimization agent 116, a security application 118, and optimization policies 122. The client security module 120 may be configured to implement optimization policies 122 developed for tuning computing system software and hardware configurations for security and performance. The cloud security server 104 may include memory 130, a processor 132, communication circuitry 134, and a security policy optimization module 136. The security policy optimization module 136 may include optimization policies 122, device data 140, applied policy metrics 142, and a policy developer 144. The security policy optimization module 136 may be configured to develop optimization policies 122, for tuning computing system software and hardware configurations for security and performance, based on telemetry of device data 140 including device hardware and software configurations, and applied policy metrics 142. The client device 102 and cloud security server 104 may be in communication using network 108.

The client device 102 may be a network element and include, for example, desktop computers, laptop computers, mobile devices, personal digital assistants, smartphones, tablets, or other similar devices. The client device 102 also may be referred to herein as "user device" or "electronic device." The client device 102 may include one or more processors 112 for executing any type of instructions associated with the client device achieving the operations detailed herein. The processor 112 is connected to memory 110 and communication circuitry 114. The processor 112 may be based on one or more processors, microcontrollers, microprocessors, and programmable logic devices, among others. The memory 110 may store computer executable instructions or computer executable components as well as other data. The processor 112 executes computer executable instructions stored in memory 110. The memory 110 may store computer executable instructions and data used by the operating system 111, the high-demand application 119, and the client security module 120. The high-demand application 119 may include any application or process that requires significant resources, such as a gaming software, an image and video editing software, data streaming software, and, in some instances, web-browsing software. The communication circuitry 114 may be used to send and receive commands, requests, and other data to and from the client device 102.

The client device 102 may include the client security module 120 to protect the client device 102 from cyber-attacks. The client security module 120 may include a security application 118, such as McAfee® Total Protection, McAfee® Live Safe, or McAfee® Gamer Security, to detect malware or potential malware on the client device 102. Client security module 120 may be configured to manage security for the client device 102, while optimizing the performance of the device, including the performance of the high-demand application 119. The client security module 120 may further include the security optimization agent 116. The security optimization agent 116 may be configured to monitor the operating system 111, detect changes in the operating system workload demands, and apply, based on workload demands, an optimization policy 122 to modify software and/or hardware configurations to prioritize protection or performance of the client device 102. For example, the security optimization agent 116 may detect that operating system workload demands are high due to the high-demand application 119, may apply a high-performance security policy (e.g., optimization policy 122), may modify the software to reallocate resources to the high-demand application 119 (e.g., reduce real-time protects by the security application 118 or modify the operating system to prioritize the high-demand application 119), may modify the hardware to allocate additional resources to the high-demand application 119 (e.g., increase processor clock speed or increase access to network bandwidth), may monitor the software and hardware modifications (e.g., monitor processor temperature) and operating system workload demands to identify a need to retune, apply an updated security policy if necessary, and may communicate data associated with the implemented or applied security optimization policy 122 to the cloud security server 104 for analysis and machine learning by the security policy optimization module 136. In some embodiments, the security optimization agent 116 and the security application 118 are combined in a single client security module 120. In some embodiments, the security optimization agent 116 and the security application 118 are in separate modules or separate locations. In some embodiments, the security optimization agent 116 and the security application 118 are separate from the client security module 120. As used herein, the terms "security policy," "security optimization policy," and "optimization policy" may be used interchangeably.

The one or more processors 112 of the client device 102 may include, without limitation, a central processing unit (CPU), a graphics processing unit (GPU), a digital signal processor (DSP), a reduced instruction set computer (RISC), a complex instruction set computer (CISC), a microprocessor, a microcontroller, a field programmable gate array (FPGA), or any combination thereof. The processors may be implemented in hardware, or combinations of hardware, and software and/or firmware, as appropriate. Software or firmware implementations of the processors may include computer-executable or machine-executable instructions written in any suitable programming language to perform the various functions described. Hardware implementations of the processors may be configured to execute computer-executable or machine-executable instructions to perform the various functions described. The client device 102 may include a chipset (not shown) for controlling communications between one or more processors and one or more of the other components of the device. The processors 112 may also include one or more application specific integrated circuits (ASICs) or application specific standard products (ASSPs) for handling specific data processing functions or tasks.

The client device 102 may include one or more memory elements 110 for storing information and data. The one or more memory elements 110 may include one or more volatile and/or non-volatile memory devices such as, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof. The memory 110 may store program instructions that are loadable and executable on the processor(s) as well as data generated or received during the execution of these programs. The memory 110 may have stored thereon software modules and/or instructions associated with other components of the device. The memory 110 may include one or more operating systems application software.

The client device 102 may include communication circuitry 114. The communication circuitry 114 of the client device 102 may be embodied as any communication circuitry, device, or collection thereof, capable of enabling communications between the client device 102 and other remote devices (e.g., the remote security policy optimization module 136). The terms "communication circuitry" and "input/output (I/O) circuitry" may be used interchangeably herein. The communication circuitry 114 may be configured to use any one or more communication technology (e.g., wireless or wired communications) and associated protocols (e.g., Ethernet, Bluetooth®, Wi-Fi®, WiMAX, etc.) to effect such communication. The client device 102 may further include GPS and other location identifiers. The client device 102 may further include peripheral devices (not shown), which may include any number of additional peripheral or interface devices and associated I/O circuitry, such as speakers, microphones, additional storage devices, among others.

Cloud security server 104 may include memory 130, a processor 132, communication circuitry 134, and a security policy optimization module 136. The processor 132 is connected to memory 130 and communication circuitry 134. The processor 132 may be based on one or more processors, microcontrollers, microprocessors, and programmable logic devices, among others. Memory 130 may store computer executable instructions or computer executable components as well as other data. The processor 132 executes computer executable instructions stored in memory 130. The communication circuitry 134 may be used to send and receive commands, requests, and other data to and from the cloud security server 104. Client device 102 and cloud security server 104 may be in communication using network 108. The security policy optimization module 136 may receive, from the client security module 120, performance data associated with an applied policy, may analyze the received data to identify opportunities to improve performance metrics, and may develop updated and/or new optimization policies (e.g., by the policy developer 144). The security policy optimization module 136 may send to the client security module 120 an updated and/or new policy based on the results of the data analysis for the security optimization agent 116 to implement.

Network 108 represents interconnected communication paths for receiving and transmitting packets of information that propagate through the security system 100. Network 108 may provide a communicative interface between devices and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. Network 108 may include a network controller.

In security system 100, network traffic, which is inclusive of packets, frames, signals, and data, among others, may be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may be provided. Suitable interfaces and infrastructure may be provided to enable communication with the cellular network.

The term "packet" as used herein, refers to a unit of data that may be routed between networked devices or between a device and the cloud security server 104. A packet may include a source network address and a destination network address. These network addresses may be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, and/or data.

As used in any embodiment herein, the term "module" may refer to hardware, firmware, and/or circuitry configured to perform any of the aforementioned operations. A module also may include software. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms a part of one or more devices, as defined previously. The terms "module," "engine," and "administrator" may be used interchangeably herein.

Figure 2A:
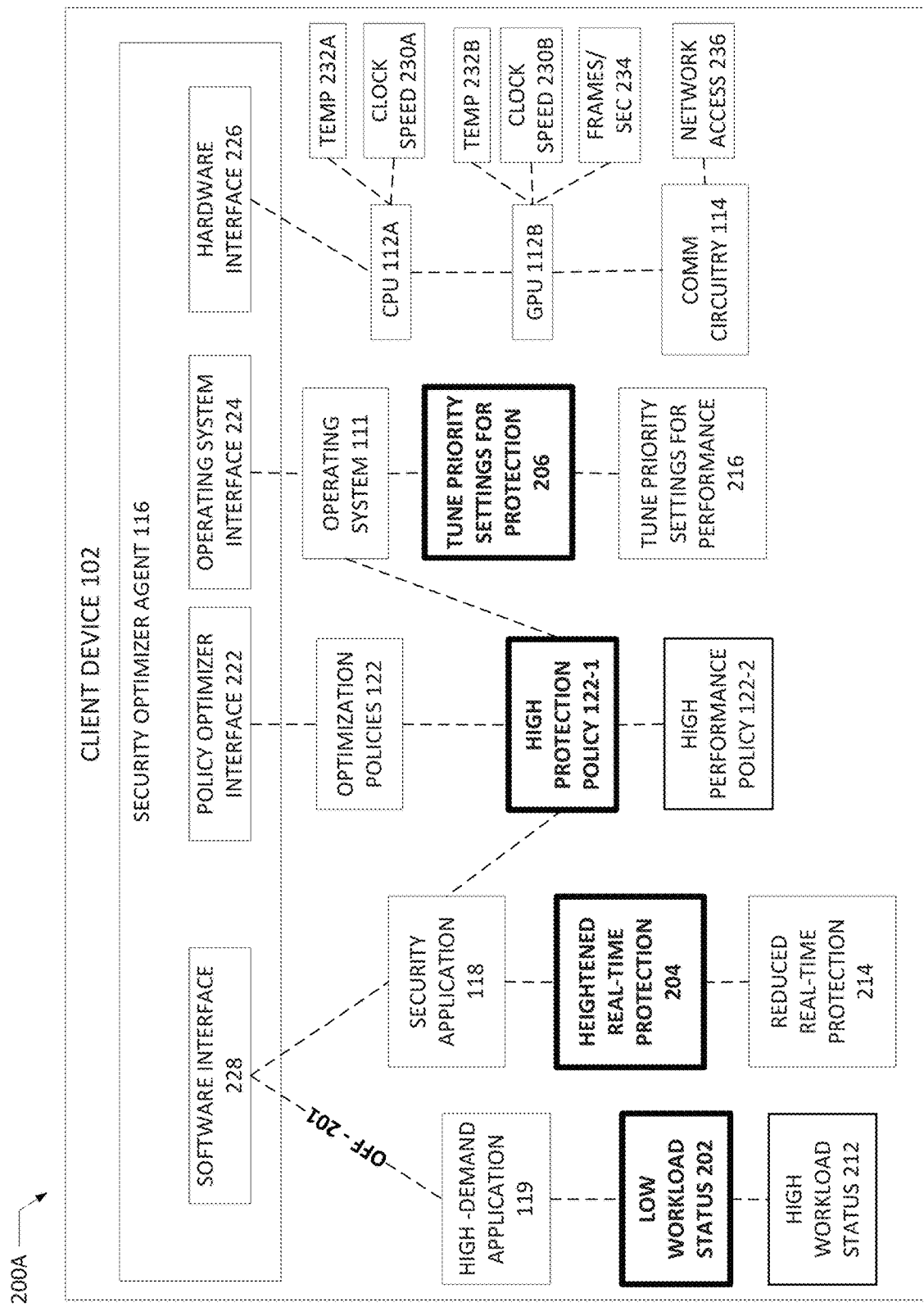
FIG. 2A is a simplified block diagram illustrating potential elements that may be associated with a security system during a low workload and high protection period, in accordance with an embodiment of the present disclosure.
Figure 2B:
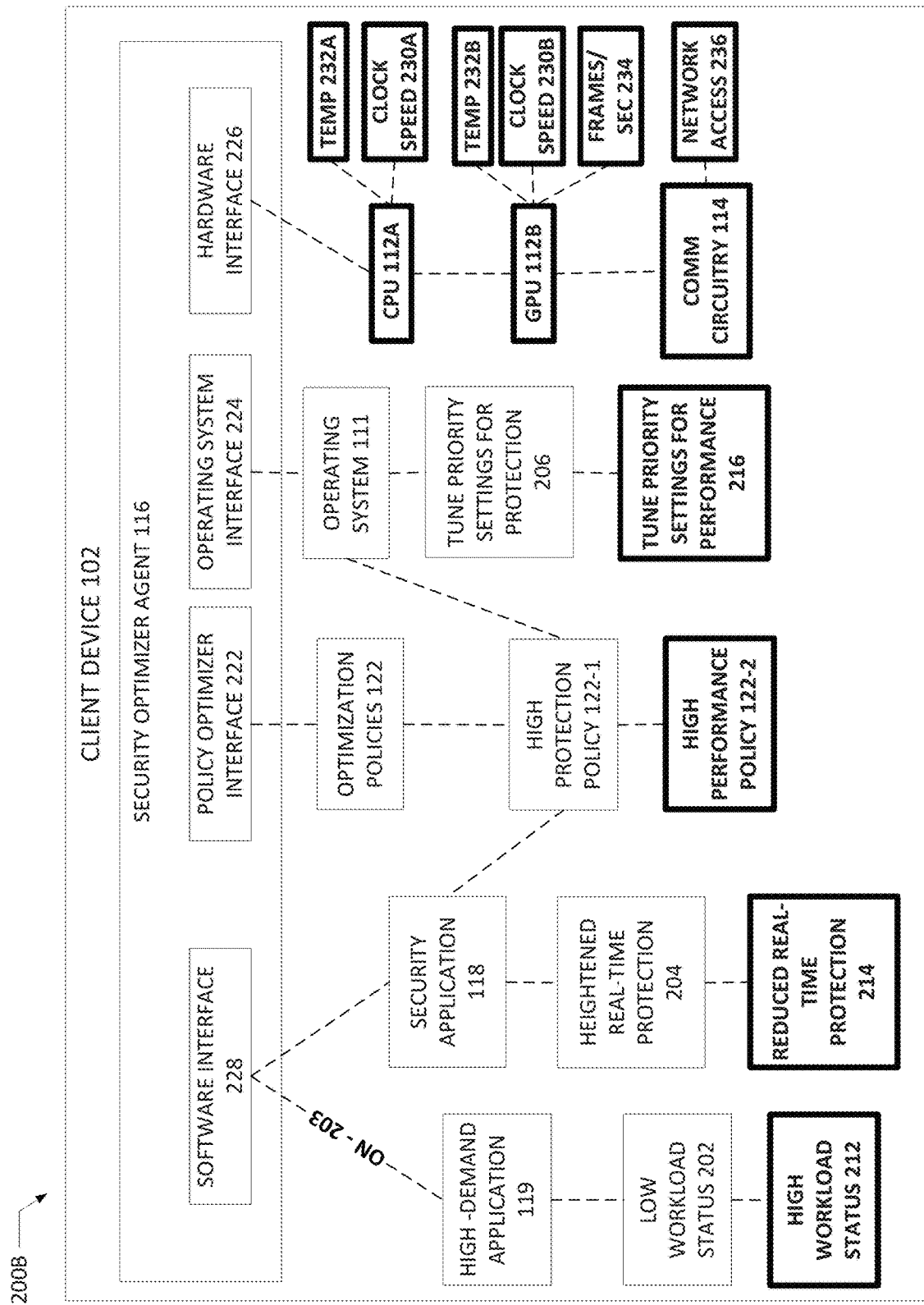
FIG. 2B is a simplified block diagram illustrating potential elements that may be associated with a security system during a high workload and high performance period, in accordance with an embodiment of the present disclosure.

FIGS. 2A and 2B are simplified block diagrams illustrating potential elements that may be associated with a security system on a client device for optimizing protection or performance, in accordance with an embodiment of the present disclosure. The security optimizer agent 116 on the client device 102 may include a policy optimizer interface 222, an operating system interface 224, a hardware interface 226, and a software interface 228. The security optimizer agent 116 may be configured to tune the client device 102 for security and performance by monitoring the workloads of the operating system, applying an optimization policy 122 that modifies software and/or hardware, monitoring the modified software and/or hardware and the operating system workloads, identifying an opportunity or a need to change the applied optimization policy, and applying an updated optimization policy 122 that modifies software and/or hardware. The policy optimizer interface 222 is in communication with the operating system 111 to monitor the workload demands and performance of the operating system 111. For example, the policy optimizer interface 222 monitors the pending tasks and associated workloads the operating system 111 is performing for the security application 118, for the high-demand application 119, and for the operating system 111, and the resources allocated to the hardware (e.g., the CPU 112A, the GPU 112B, and communication circuitry 114. The policy optimizer interface 222 may also implement an optimization policy 122, and may monitor client device performance while the optimization policy 122 is applied. The policy optimizer interface 222 may further communicate the data associated with the applied optimization policy to the cloud security server 104 for analysis. In some embodiments, the policy optimizer interface 222 may store data associated with the applied optimization policy in memory 110. The operating system interface 224 may modify and monitor operating system settings as defined by the applied optimization policy. For example, the operating system interface 224 may change priority settings of tasks in accordance with the applied optimization policy and may monitor for changes in the workload demands. The hardware interface 226 may modify and monitor the hardware in response to an applied optimization policy. For example, the hardware interface 226 may increase the clock speed 230 of the CPU 112A and/or the GPU 112B, may monitor the temperature 232 of the CPU 112A and/or the GPU 112B, may monitor the utilization of the GPU 112B (e.g., frames per second 234), and may reprioritize network access 236 via the communication circuitry 114 by reallocating network bandwidth from one application to another application. The software interface 228 monitors and modifies the software (e.g., the security application 118 and the high-demand application 119) in response to an applied optimization policy. For example, the software interface 228 may modify and monitor the security application 118 to reduce or expand protections implemented by the security application 118 (e.g., turn anti-virus scanners on or off, or allow or prevent downloads of virus definition sets). By modifying the security application 118. the software interface 228 may modify the resources allocated to the security application, such as CPU cycles, memory, and network bandwidth. In some embodiments, the security optimizer agent 116 applies the high protection policy 122-1 by default, monitors the operating system for high workload demands, applies the high performance policy 122-2, monitors for system changes (e.g., change to low workload demands or overheating of CPU), and reapplies the high protect policy 122-1. The security optimizer agent 116 may continue the process (e.g., being in high protection mode, monitoring for an opportunity to change to high performance mode, changing to high performance mode, and monitoring for an opportunity to return to high protection mode) without requiring any user interface. In some embodiments, the policies are stored using JavaScript Object Notation (e.g., a named JSON file). In some embodiments, the software and hardware configurations associated with the policies are dynamic link libraries (DLLs) or static libraries. In some embodiments, the monitoring of the operating system is performed using operating system logs (e.g., Microsoft Windows Event Trace Logs (ETL)). In some embodiments, the CPU and GPU temperatures may be monitored using any suitable technique, such as a Kernel Driver.

FIG. 2A is a simplified block diagram illustrating potential elements that may be associated with a security system on a client device during a low workload and high protection period, in accordance with an embodiment of the present disclosure. The security optimizer agent 116 monitors the operating system 11 via the operating system interface 224 and determines that the workload demands are low (e.g., low workload status 202, as depicted by the bolded text and frame), for example, when the high-demand application 119 is off 201 or in a background window. A low workload demand may be based on a system's capabilities (e.g., the system's architecture) and may vary from system-to-system. For example, a first system may have an optimization policy that defines a low workload status when the operating system has 50% or more availability, and a second system may have an optimization policy that defines a low workload status when the operating system has 30% or more availability. In response to determining that the operating system is in a low workload status 202, the security optimizer agent 116 applies a high protection policy 122-1, as depicted by the bolded text and frame, to optimize security of the client device 102. The high protection policy 122-1, when applied, initiates heightened real-time protection 204, as depicted by the bolded text and frame, by the security application 118. During heightened real-time protection 204, the security application 118 optimizes protection of the client device 102 by, for example, enabling all anti-virus scanners, by downloading new virus definition sets, by performing real-time scanning, by determining whether uploaded data needs to be protected and saving the uploaded data in memory, and by enabling software updates, visual effects, and notifications (e.g., toast notifications). The high protection policy 122-1, when applied, also modifies the operating system 111 to tune priority settings for protection 206. For example, the operating system 111 during the application of the high protection policy 122-1 may apply default prioritizations to applications and processes, or may prioritize the security application 118 and allocate resources to the security application 118.

FIG. 2B is a simplified block diagram illustrating potential elements that may be associated with a security system during a high workload and high performance period, in accordance with an embodiment of the present disclosure. The security optimizer agent 116 monitors the operating system 11 via the operating system interface 224 and determines that the workload demands are high (e.g., high workload status 212, as depicted by the bolded text and frame), for example, when the high-demand application 119 is on 203 or in a foreground window. A high workload demand may be based on a system's capabilities (e.g., the system's architecture) and may vary from system-to-system. For example, a first system may have an optimization policy that defines a high workload status when the operating system has 90% or more utilization, and a second system may have an optimization policy that defines a high workload status when the operating system has 75% or more utilization. In another example, a system may define a high workload demand based on whether the high demand application is starved for resources or whether there is an opportunity to boost performance of the system. In response to determining that the operating system is in a high workload status 212, the security optimizer agent 116 applies a high performance policy 122-2, as depicted by the bolded text and frame, to optimize performance of the client device 102. The high performance policy 122-2, when applied, initiates reduced real-time protection 214, as depicted by the bolded text and frame, by the security application 118. During reduced real-time protection 214, the security application 118 is modified to decrease protection of the client device 102, for example, by disabling all or most of the real-time security scanners (i.e., anti-virus detectors), by preventing the downloading of new virus definition sets, or by disabling security application updates. The high performance policy 122-2 may also modify other software applications to increase operating system performance, for example, by not saving uploaded data in memory, by disabling software updates, by disabling visual effects, and by disabling notifications (e.g., toast notifications). The high performance policy 122-2, when applied, may also modify the operating system 111 to tune priority settings for performance 216. For example, the operating system 111 during the application of the high performance policy 122-2 may prioritize the high-demand application 119 and allocate hardware resources to the high-demand application 119. In the example where hardware resources are allocated to the high-demand application 119, the security optimizer agent 116 may increase the clock speed 230A of the CPU 112A and/or the clock speed 230 B of the GPU 112B to meet the workload demands of the high-demand application 119 and may allocate network access 236 to the high-demand application 119 (e.g., prevent other applications from accessing network bandwidth). The security optimizer agent 116 may further monitor the hardware modifications. For example, the security optimizer agent 116 may monitor the CPU temperature 232A during the period of increased clock speed to maintain the temperature below a threshold and, if the temperature exceeds the threshold, the security optimizer agent 116 may reduce the CPU clock speed 230A (e.g., revert the clock speed to the factory default setting). The security optimizer agent 116 may likewise monitor the GPU temperature 232B during the period of increased clock speed to maintain the temperature below a threshold and, if the temperature exceeds the threshold, the security optimizer agent 116 may reduce the CPU clock speed 230B (e.g., revert the clock speed to the factory default setting). In another example, the security optimizer agent 116 may monitor the utilization of the GPU 112B (e.g., frames per second 234) to determine if workload demands are being met, and, if not being met, the security optimizer agent 116 may further reduce operating system resources allocated to the security application 119 and other applications. In another example, the security optimizer agent 116 may monitor the network access 236 to determine whether network bandwidth demands are being met and, if not being met, the security optimizer agent 116 may prevent the security application 118 and other applications from accessing the network. Although FIG. 2 identifies only two optimization policies, a high protection policy and a high performance policy, a security system may include any suitable number of policies and the optimization policies may have any range of protection and performance.

Figure 3:
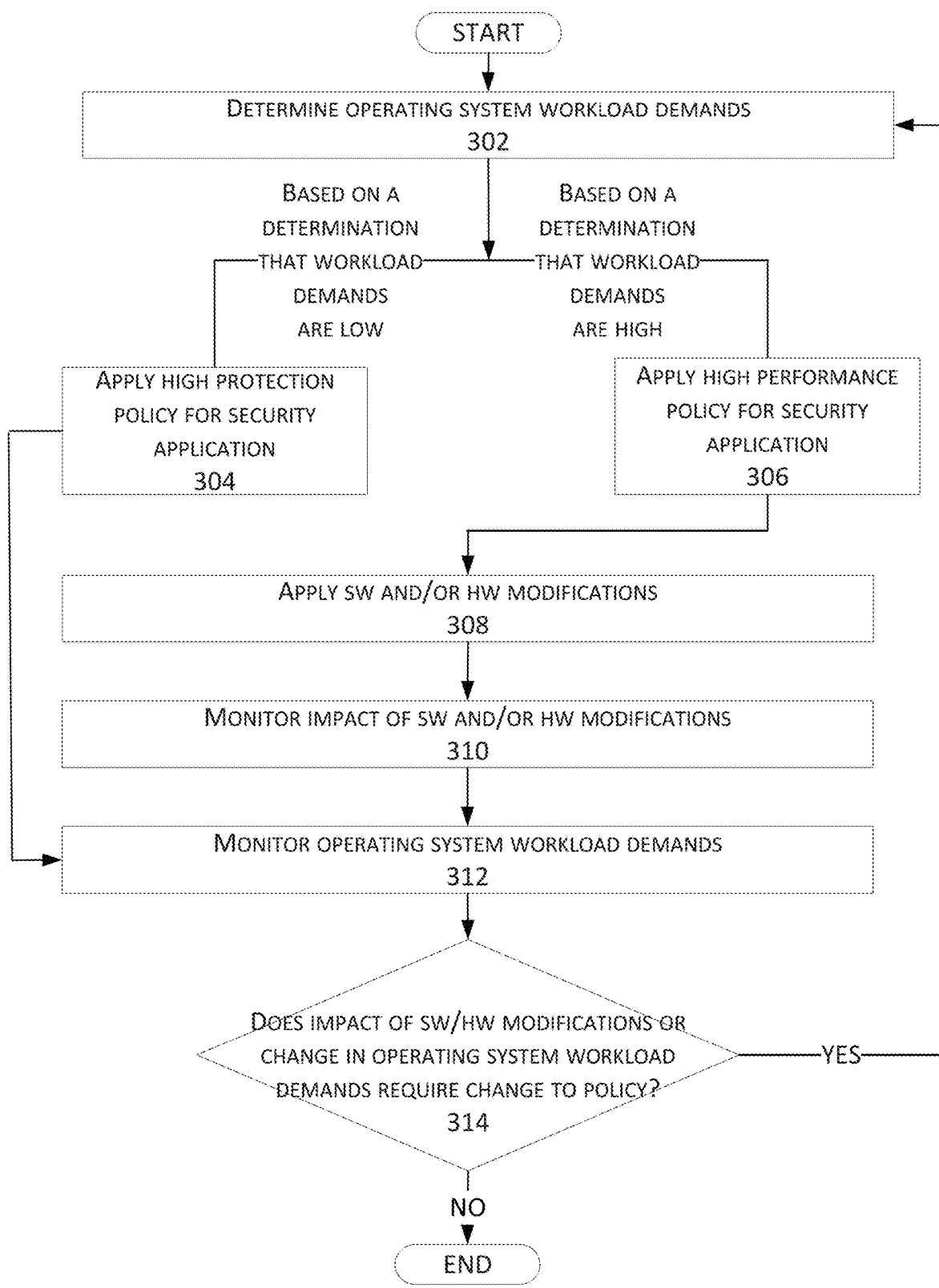
FIG. 3 is a simplified flowchart illustrating potential operations that may be associated with tuning a computing system for security and performance, in accordance with an embodiment of the present disclosure.

FIG. 3 is a simplified flowchart illustrating potential operations that may be associated with tuning a computing system for security and performance, in accordance with an embodiment of the present disclosure. The one or more operations may be performed by the security optimizer agent 116, by the client security module 120, or by a combination of the security optimizer agent 116 and the client security module 120. At 302, the operating system is analyzed to determine the workload demands. For example, the operating system may be monitored to determine the amount of system resources being used and whether a high-demand application is running and using system resources. In some embodiments, the security optimizer agent 116 may monitor the operating system to identify workload demands and any changes to workload demands. In some embodiments, the security optimizer agent 116 may be notified of operating system workload demands and any changes to workload demands. In some embodiments, workload demands are determined by comparing resource utilization thresholds with predefined requirements. For example, if workload demands are using more than 80 percent of the system resources and a high-demand application is actively running, the security optimizer agent 116 determines that the workload demands are high. In another example, if workload demands are using less than 50 percent of the system resources and a high-demand application is not actively running, the security optimizer agent 116 determines that the workload demands are low. In some embodiments, the workload demand thresholds may be specified in the optimization policy. At 304, based on a determination that the workload demands are low, a high protection policy is applied, such that protection by the security application is optimized. After the high protection policy is applied, the process continues to 312. At 306, based on a determination that the workload demands are high, a high performance policy is applied, such that protection by the security application is reduced and performance of the computing system is optimized. At 308, software and/or hardware modifications indicated by the high performance policy are applied. Any suitable software and/or hardware modifications may be applied, for example, as described above with reference to FIG. 2. In some embodiments, only software modifications are applied. In some embodiments, only hardware modifications are applied. In some embodiments, both software and hardware modifications are applied. At 310, the applied software and/or hardware modifications are monitored. For example, the software and/or hardware modifications may be monitored to assess their impact on the computing system performance, to detect a negative or harmful impact on the computing system, such as overheating a processor, and to collect data for analysis by the remote optimization module (e.g., the security policy optimization module 136). At 312, the workload demands of the operating system are monitored. For example, the operating system may be monitored to determine whether workload demands have changed such that the applied policy is no longer necessary (e.g., high workload demands have changed to low or low workload demands have changed to high). At 314, a determination is made whether to change the applied policy. A change in the applied policy may be necessary based on a negative impact of the software and/or hardware modifications or based on a change in the operating system workload demands. If a change in policy is necessary, the operation proceeds back to 302. If a change in policy is not necessary, then the operation ends. The performance data associated with the applied policy (e.g., software monitoring, hardware monitoring, and operating system monitoring) may be sent to the remote optimization module for analysis and policy development during monitoring or may be collected and sent after the monitoring for the applied policy is complete.

Figure 4:
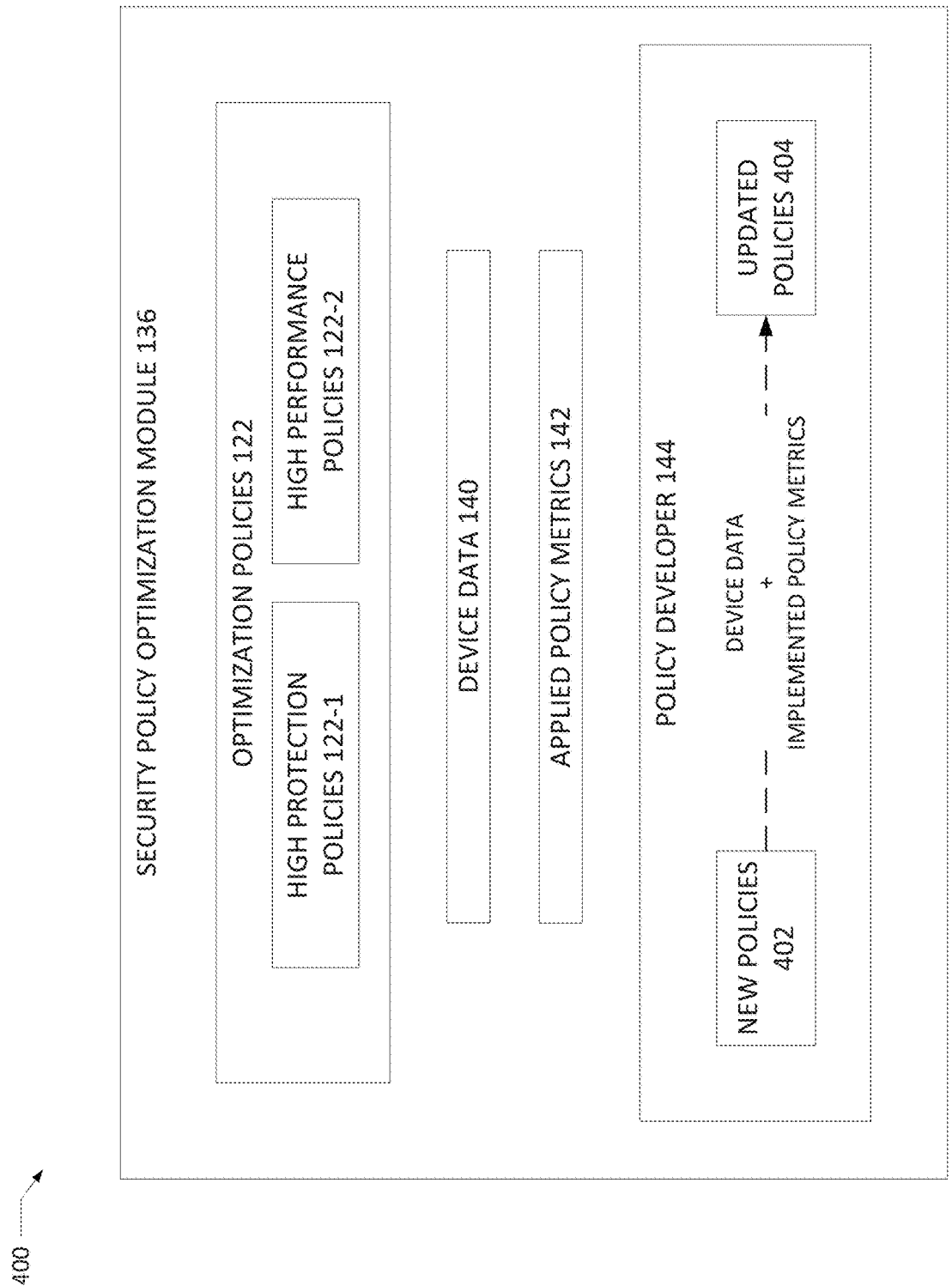
FIG. 4 is a simplified block diagram of an example security policy optimization module, in accordance with an embodiment of the present disclosure.

FIG. 4 is a simplified block diagram of an example security policy optimization module, in accordance with an embodiment of the present disclosure. The security policy optimization module 136 may include optimization policies 122, device data 140, applied policy metrics 142, and a policy developer 144. The optimization policies 122 may include one or more high protection policies 122-1 and one or more high performance policies 122-2. The high protection policies 122-1 may include rules or procedures for how the security optimizing agent is to configure software, in particular, the security application 118, and hardware on a client device 102 for optimizing protection by the security application 118. In some embodiments, the rules for configuring software and hardware for optimizing protection may be included in one policy. In some embodiments, the rules for configuring software and hardware for optimizing protection may be included in multiple policies that are applied in series or in unison. In some embodiments, the rules for optimizing protection may include only modifications to the software configuration on the client device 102. The high performance policies 122-2 may include rules or procedures for how the security optimizing agent is to configure software, in particular, the security application, and hardware on a client device 102 for optimizing performance. In some embodiments, the rules for configuring software and hardware for optimizing performance may be included in one policy. In some embodiments, the rules for configuring software and hardware for optimizing performance may be included in multiple policies that are applied in series or in unison. In some embodiments, the rules for optimizing performance may include only modifications to the hardware configuration on the client device 102.

The security policy optimization module 136 may receive from the client device 102 device data 140 of the software and hardware components of the client device 102 as well as software and hardware configurations and capabilities. The device data 140 may further include performance data that is collected during the implementation of an optimization policy on the client device 102. The security policy optimization module 136 may store the device data 140 in memory 130 in the cloud security server 104. In some embodiments, the device data 140 includes only data from the client device 102. In some embodiments, the device data includes aggregated data from the client device 102 and from other devices. In some embodiments, the device data 140 included from other devices includes other devices that have similar software and hardware components to the client device 102, such that optimization policies may be developed for devices having specific software and hardware components. In some embodiments, the device data 140 included from other devices includes other devices that have different software and hardware components than the client device 102, such that optimization policies may be developed to mitigate the differences in the software and hardware components.

The security policy optimization module 136 may include applied policy metrics 142, which are metrics developed for an optimization policy to determine whether the applied optimization policy is delivering the optimization as intended. The security policy optimization module 136 may receive the performance data from the client device 102. The security policy optimization module 136 may compare the received performance data to the applied policy metrics 142 to determine whether an optimization policy is achieving the desired results. For example, the applied policy metrics 142 for a high performance policy 122-2 may include a target that the GPU provide a minimum of 30 frames per second. The security policy optimization module 136 may determine from the performance data during the applied high performance policy 122-2 that the GPU provided 28 frames per second, such that the high performance policy 122-2 failed to the desired optimization results. In another example, the applied policy metrics 142 may include a target that the GPU provide a minimum of 30 frames per second. The security policy optimization module 136 may determine from the performance data during the applied high performance policy 122-2, which included overclocking the GPU, that the GPU overheated and the high performance policy 122-2 was removed, which caused erratic frames per second (e.g., peaks and valleys of the frames per second above and below the targeted 30 frames per second). The policy developer 144 develops new optimization policies 402 and develops updated policies 404 based on the device data 140 and the applied policy metrics 142 to learn from the practical application of the optimization policy. The practical learning helps to improve the optimization policy so that it may achieve the desired results. For example, in the example of overclocking the GPU, the updated policy 404 may not include a procedure for overclocking the GPU in a low-end device because of the likelihood of overheating the GPU, and the updated policy 404 may include only procedures for modifying software configurations to meet the desired results. The security policy optimization module 136 may deploy the updated policy 404 to the security optimization agent 116 on the client device 102 for implementation.

Figure 5:
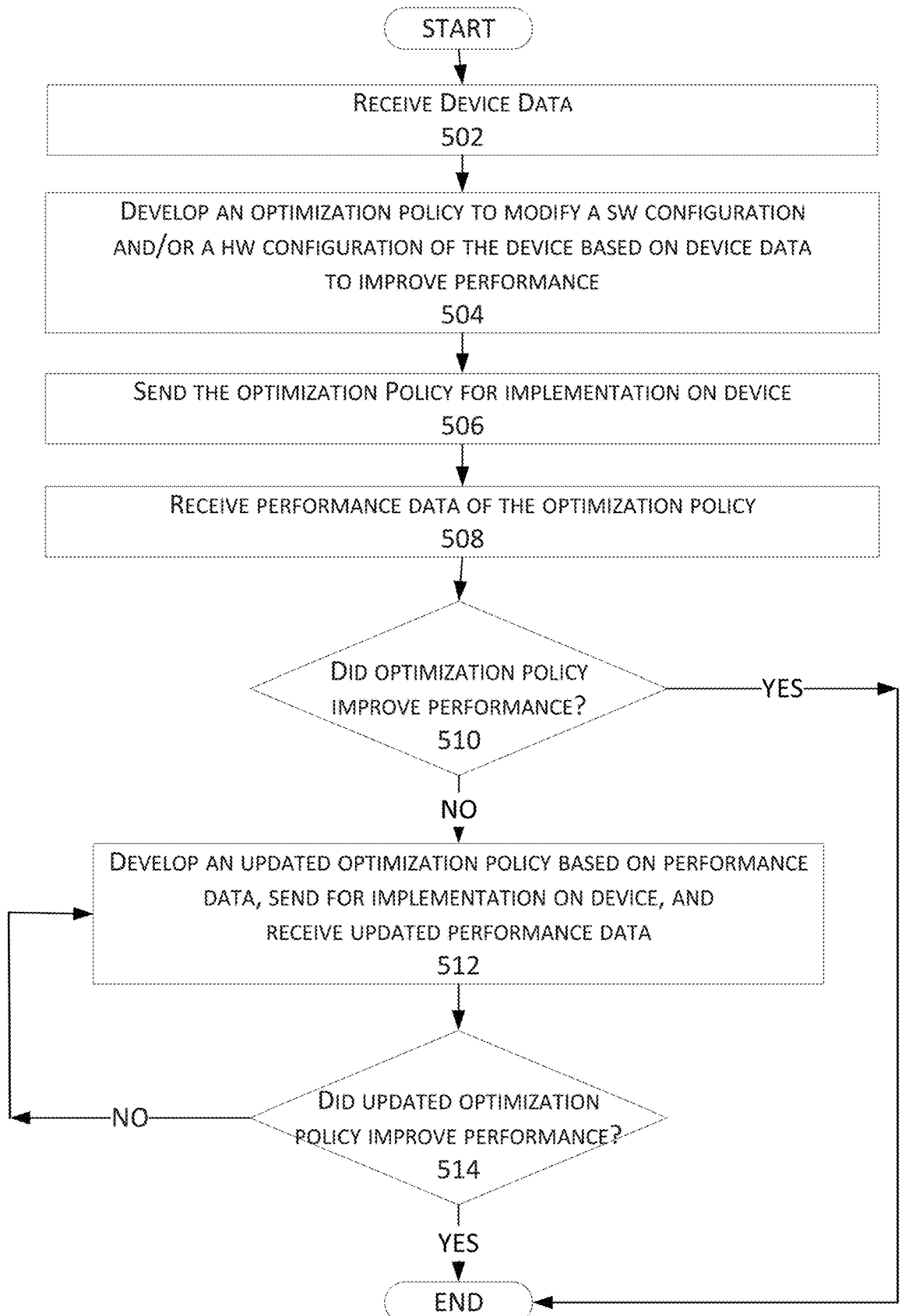
FIG. 5 is a simplified flowchart illustrating potential operations that may be associated with developing policies for tuning a computing system for security and performance, in accordance with an embodiment of the present disclosure.

FIG. 5 is a simplified flowchart illustrating potential operations that may be associated with developing new and updated policies for tuning a computing system for security and performance, in accordance with an embodiment of the present disclosure. The one or more operations may be performed by the security policy optimization module 136. At 502, device data is received. The device data may include the software and the hardware components of the device that identify the potential software and hardware configurations and the capabilities of the client device and, in some embodiments, of other devices. For example, the device data may include the number and types of CPUs, the number and types of GPUs, the number and types of memory elements, the types of hardware sensors, and the software applications installed on the device. At 504, an optimization policy is developed based on the device data to identify a software configuration and/or a hardware configuration to improve performance. For example, for a high performance optimization policy, a software configuration may include modifying the security application to turn scanners off and a hardware configuration may include increasing the clock speed of the CPU. In another example, for a high protection optimization policy, a software configuration may include modifying the security application to turn anti-virus scanners on and a hardware configuration may include increasing the security policies network bandwidth for downloading anti-virus updates. At 506, the optimization policy is sent to the client device for implementation. For example, the device may implement the optimization policy as described above with reference to FIG. 3. At 508, performance data during implementation of the optimization policy is received. At 510, based on the performance data, a determination is made as to whether the optimization policy improved performance. For example, the performance data may be analyzed and compared to applied policy metrics, as described above with reference to FIG. 4, to determine whether the optimization policy met the desired performance expectations. If the optimization policy improved the performance of the device as desired, then the process ends. If the optimization policy did not improve the performance of the device as desired, then the process proceeds to 512. At 512, an updated optimization policy is developed based on the received performance data, the updated optimization policy is sent to the client device for implementation, and performance data during implementation of the updated optimization policy. In some embodiments, the updated optimization policy may be developed based on aggregated data that includes performance data received from other devices. At 514, based on the updated performance data, a determination is made as to whether the updated optimization policy improved performance. If the updated optimization policy improved the performance of the device as desired, then the process ends. If the updated optimization policy did not improve the performance of the device as desired, then the process proceeds back to 512 and the operations at 512 and 514 may be repeated until an updated optimization policy that improves performance as expected is developed.

Figure 6:
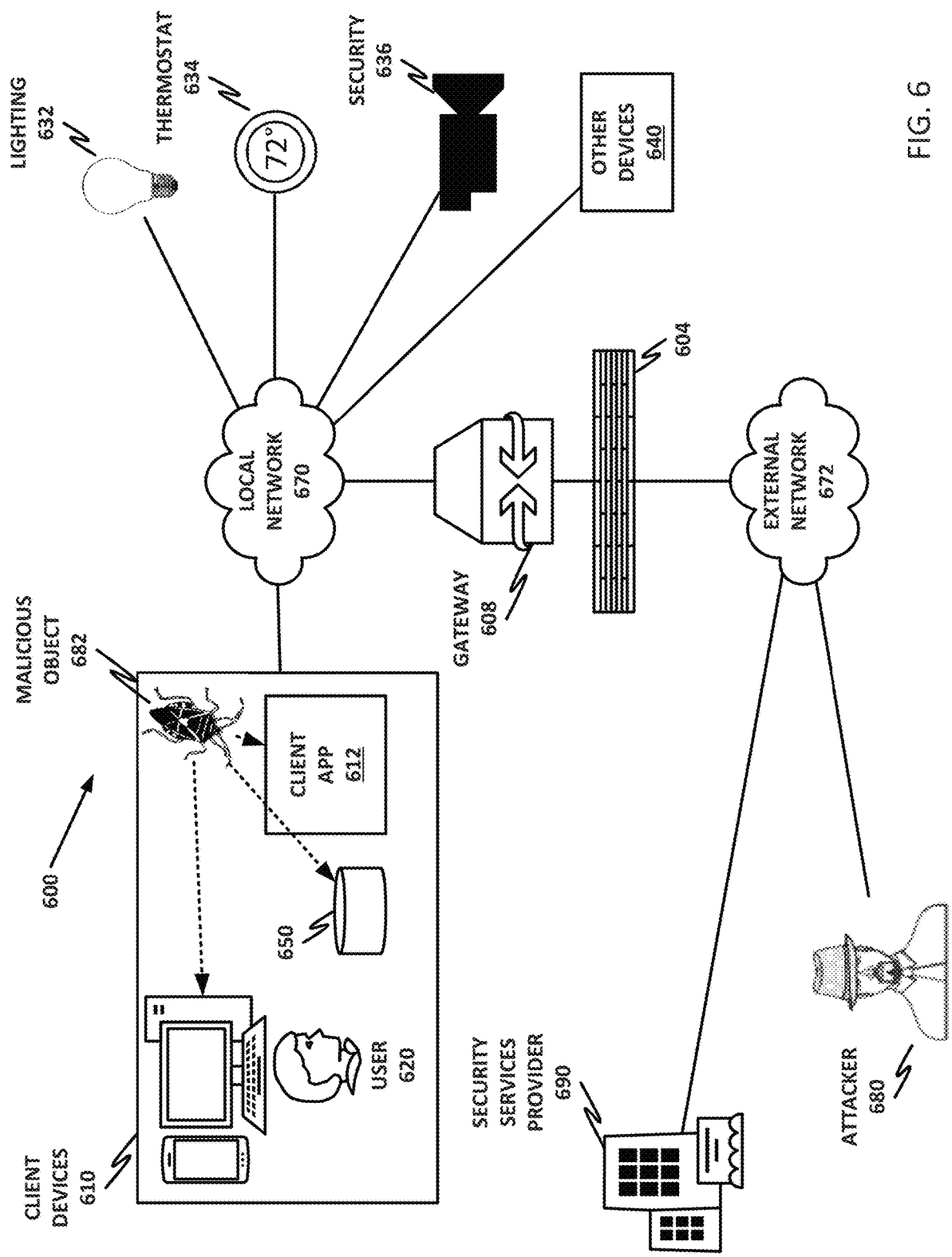
FIG. 6 is a block diagram of selected elements of a security ecosystem.

FIG. 6 is a block diagram of a security ecosystem 600. In the example of FIG. 6, security ecosystem 600 may be an enterprise, a government entity, a data center, a telecommunications provider, a "smart home" with computers, smart phones, and various internet of things (IoT) devices, or any other suitable ecosystem. Security ecosystem 600 is provided herein as an illustrative and nonlimiting example of a system that may employ, and benefit from, the teachings of the present specification.

Within security ecosystem 600, one or more users 620 operate one or more client devices 610. A single user 620 and single client device 610 are illustrated here for simplicity, but a home or enterprise may have multiple users, each of which may have multiple devices, such as desktop computers, laptop computers, smart phones, tablets, hybrids, or similar.

Client devices 610 may be communicatively coupled to one another and to other network resources via local network 670. Local network 670 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 670 may also include one or more servers, firewalls, routers, switches, security appliances, antivirus servers, or other network devices, which may be single-purpose appliances, virtual machines, containers, or functions. Some functions may be provided on client devices 610.

In this illustration, local network 670 is shown as a single network for simplicity, but in some embodiments, local network 670 may include any number of networks, such as one or more intranets connected to the internet. Local network 670 may also provide access to an external network, such as the internet, via external network 672. External network 672 may similarly be any suitable type of network.

Local network 670 may connect to the internet via gateway 608, which may be responsible, among other things, for providing a logical boundary between local network 670 and external network 672. Local network 670 may also provide services such as dynamic host configuration protocol (DHCP), gateway services, router services, and switching services, and may act as a security portal across local boundary 604.

In some embodiments, gateway 608 may be a standalone internet appliance. Such embodiments are popular in cases in which ecosystem 600 includes a home or small business. In other cases, gateway 608 may run as a virtual machine or in another virtualized manner. In larger enterprises that features service function chaining (SFC) or network function virtualization (NFV), gateway 608 may be include one or more service functions and/or virtualized network functions.

Local network 670 may also include a number of discrete IoT devices. For example, local network 670 may include IoT functionality to control lighting 632, thermostats or other environmental controls 634, a security system 636, and any number of other devices 640. Other devices 640 may include, as illustrative and nonlimiting examples, network attached storage (NAS), computers, printers, smart televisions, smart refrigerators, smart vacuum cleaners and other appliances, and network connected vehicles.

Local network 670 may communicate across local boundary 604 with external network 672. Local boundary 604 may represent a physical, logical, or other boundary. External network 672 may include, for example, websites, servers, network protocols, and other network-based services. In one example, an attacker 680 (or other similar malicious or negligent actor) also connects to external network 672. A security services provider 690 may provide services to local network 670, such as security software, security updates, network appliances, or similar. For example, MCAFEE, LLC provides a comprehensive suite of security services that may be used to protect local network 670 and the various devices connected to it.

It may be a goal of users 620 to successfully operate devices on local network 670 without interference from attacker 680. In one example, attacker 680 is a malware author whose goal or purpose is to cause malicious harm or mischief, for example, by injecting malicious object 682 into client device 610. Once malicious object 682 gains access to client device 610, it may try to perform work such as social engineering of user 620, a hardware-based attack on client device 610, modifying storage 650 (or volatile memory), modifying client application 612 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 680 to leverage against local network 670.

Malicious harm or mischief may take the form of installing root kits or other malware on client devices 610 to tamper with the system, installing spyware or adware to collect personal and commercial data, defacing websites, operating a botnet such as a spam server, or simply to annoy and harass users 620. Thus, one aim of attacker 680 may be to install his malware on one or more client devices 610 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 680 may also want to commit industrial or other espionage, such as stealing classified or proprietary data, stealing identities, or gaining unauthorized access to enterprise resources. Thus, attacker's strategy may also include trying to gain physical access to one or more client devices 610 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 680. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 670 may contract with or subscribe to a security services provider 690, which may provide security services, updates, antivirus definitions, patches, products, and services. MCAFEE, LLC is a nonlimiting example of such a security services provider that offers comprehensive security and antivirus solutions. In some cases, security services provider 690 may include a threat intelligence capability such as McAfee's GTI database, or similar product. Security services provider 690 may update its threat intelligence database by analyzing new candidate malicious objects as they appear on client networks and characterizing them as malicious or benign.

Other security considerations within security ecosystem 600 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

FIG. 7 is a block diagram of a hardware platform 700. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 700, even though they may be scattered across a data center, or even located in different data centers.

Hardware platform 700 is configured to provide a computing device. In various embodiments, a "computing device" may be or comprise, by way of nonlimiting example, a computer, workstation, server, mainframe, virtual machine (whether emulated or on a "bare-metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 700 is arranged in a point-to-point (PtP) configuration. This PtP configuration is popular for personal computer (PC) and server-type devices, although it is not so limited, and any other bus type may be used.

Hardware platform 700 is an example of a platform that may be used to implement embodiments of the teachings of this specification. For example, instructions could be stored in storage 750. Instructions could also be transmitted to the hardware platform in an ethereal form, such as via a network interface, or retrieved from another source via any suitable interconnect. Once received (from any source), the instructions may be loaded into memory 704, and may then be executed by one or more processor 702 to provide elements such as an operating system 706, operational agents 708, or data 712.

Hardware platform 700 may include several processors 702. For simplicity and clarity, only processors PROC0 702-1 and PROC1 702-2 are shown. Additional processors (such as 2, 4, 8, 16, 24, 32, 64, or 128 processors) may be provided as necessary, while in other embodiments, only one processor may be provided. Details of processors 702 are not illustrated in this FIGURE. Processors may have any number of cores, such as 1, 2, 4, 8, 16, 24, 32, 64, or 128 cores.

Processors 702 may be any type of processor and may communicatively couple to chipset 716 via, for example, PtP interfaces. Chipset 716 may also exchange data with other elements, such as a high-performance graphics adapter 722. In alternative embodiments, any or all of the PtP links illustrated in FIG. 7 could be implemented as any type of bus, or other configuration rather than a PtP link. In various embodiments, chipset 716 may reside on the same die or package as a processor 702 or on one or more different dies or packages. Each chipset may support any suitable number of processors 702. A chipset 716 (which may be a chipset, uncore, Northbridge, Southbridge, or other suitable logic and circuitry) may also include one or more controllers to couple other components to one or more CPUs.

Two memories, 704-1 and 704-2 are shown, connected to PROC0 702-1 and PROC1 702-2, respectively. As an example, each processor is shown connected to its memory in a direct memory access (DMA) configuration, though other memory architectures are possible, including ones in which memory 704 communicates with processor 702 via a bus. For example, some memories may be connected via a system bus, or in a data center, memory may be accessible in a remote DMA (RDMA) configuration.

Memory 704 may include any form of volatile or nonvolatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 704 may be used for short, medium, and/or long-term storage. Memory 704 may store any suitable data or information utilized by platform logic. In some embodiments, memory 704 may also comprise storage for instructions that may be executed by the cores of processors 702 or other processing elements (e.g., logic resident on chipsets 716) to provide functionality.

In certain embodiments, memory 704 may comprise a relatively low-latency volatile main memory, while storage 750 may comprise a relatively higher-latency nonvolatile memory. However, memory 704 and storage 750 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 704 and storage 750, for example, in a single physical memory device, and in other cases, memory 704 and/or storage 750 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 722 may be configured to provide a human-readable visual output, such as a command-line interface (CLI) or graphical desktop such as Microsoft Windows, Apple OSX desktop, or a Unix/Linux X Window System-based desktop. Graphics adapter 722 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 722 may include a hardware graphics card, which may have its own memory and its own graphics processing unit (GPU).

Chipset 716 may be in communication with a bus 728 via an interface circuit. Bus 728 may have one or more devices that communicate over it, such as a bus bridge 732, I/O devices 735, accelerators 746, communication devices 740, and a keyboard and/or mouse 738, by way of nonlimiting example. In general terms, the elements of hardware platform 700 may be coupled together in any suitable manner. For example, a bus may couple any of the components together. A bus may include any known interconnect, such as a multi-drop bus, a mesh interconnect, a fabric, a ring interconnect, a round-robin protocol, a point-to-point interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 740 can broadly include any communication not covered by a network interface and the various I/O devices described herein. This may include, for example, various USB, FireWire, Lightning, or other serial or parallel devices that provide communications.

I/O Devices 735 may be configured to interface with any auxiliary device that connects to hardware platform 700 but that is not necessarily a part of the core architecture of hardware platform 700. A peripheral may be operable to provide extended functionality to hardware platform 700, and may or may not be wholly dependent on hardware platform 700. In some cases, a peripheral may be a computing device in its own right. Peripherals may include input and output devices such as displays, terminals, printers, keyboards, mice, modems, data ports (e.g., serial, parallel, universal serial bus (USB), Firewire, or similar), network controllers, optical media, external storage, sensors, transducers, actuators, controllers, data acquisition buses, cameras, microphones, speakers, or external storage, by way of nonlimiting example.

In one example, audio I/O 742 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 732 may be in communication with other devices such as a keyboard/mouse 738 (or other input devices such as a touch screen, trackball, etc.), communication devices 740 (such as modems, network interface devices, peripheral interfaces such as PCI or PCIe, or other types of communication devices that may communicate through a network), audio I/O 742, and/or accelerators 746. In alternative embodiments, any portions of the bus architectures could be implemented with one or more PtP links.

Operating system 706 may be, for example, Microsoft Windows, Linux, UNIX, Mac OS X, iOS, MS-DOS, or an embedded or real-time operating system (including embedded or real-time flavors of the foregoing). In some embodiments, a hardware platform 700 may function as a host platform for one or more guest systems that invoke application (e.g., operational agents 708).

Operational agents 708 may include one or more computing engines that may include one or more non-transitory computer-readable mediums having stored thereon executable instructions operable to instruct a processor to provide operational functions. At an appropriate time, such as upon booting hardware platform 700 or upon a command from operating system 706 or a user or security administrator, processor 702 may retrieve a copy of the operational agent (or software portions thereof) from storage 750 and load it into memory 704. Processor 702 may then iteratively execute the instructions of operational agents 708 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 700 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 700 may be virtualized, in particular the processor (s) and memory. For example, a virtualized environment may run on OS 706, or OS 706 could be replaced with a hypervisor or virtual machine manager. In this configuration, a virtual machine running on hardware platform 700 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 7 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), field-programmable gate arrays (FPGAs), and other semiconductor chips.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a non-volatile memory. Thus, for example, an "engine" as described above could include instructions stored within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and non-limiting example, a magnetic media (e.g., hard drive), a flash memory, a read-only memory (ROM), optical media (e.g., CD, DVD, Blu-Ray), non-volatile random access memory (NVRAM), non-volatile memory (NVM) (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a non-limiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

EXAMPLE IMPLEMENTATIONS

The following paragraphs provide various examples of the embodiments disclosed herein.

Example 1 is an apparatus, including: a memory element operable to store instructions; and a processor operable to execute the instructions, such that the apparatus is configured to: determine, based on operating system workload demands, whether a high-demand application is running; and apply, based on a determination that a high-demand application is running, an optimization policy that modifies a security application, wherein the optimization policy modification includes reducing a protection applied by the security application.

Example 2 may include the subject matter of Example 1, and may further specify that the optimization policy is a first optimization policy, and the apparatus is further configured to: determine, based on operating system workload demands, that the high-demand application is not running; and apply, based on a determination that the high-demand application is not running, a second optimization policy that modifies the security application, wherein the second optimization policy modification includes restoring the protection applied by the security application that was reduced by the first optimization policy.

Example 3 may include the subject matter of Examples 1 or 2, and may be further configured to: monitor the optimization policy modification; collect performance data associated with the optimization policy modification; and send, to a cloud server, the performance data for analysis to determine whether the operating system achieved a threshold performance while the optimization policy was applied.

Example 4 may include the subject matter of any of Examples 1-3, and may further specify that reducing a protection applied by the security application includes disabling one or more real-time security scanners, preventing new virus definition sets from downloading, or disabling security application updates.

Example 5 may include the subject matter of any of Examples 1-4, and may further specify that the optimization policy is a first optimization policy, and the apparatus is further configured to: apply a second optimization policy that modifies a hardware configuration.

Example 6 may include the subject matter of Example 5, and may further specify that the hardware modification includes overclocking a processor speed or allocating, to the high-demand application, priority access to network bandwidth.

Example 7 may include the subject matter of Example 5, and may be further configured to: monitor the impact of the hardware modification, wherein monitoring the impact includes monitoring a temperature of the processor or monitoring a utilization of network bandwidth.

Example 8 may include the subject matter of Example 7, may be further configured to: determine whether the impact of the hardware modification requires the second optimization policy to be changed; apply, based on a determination that the impact of the hardware modification requires that the second optimization policy be changed, a third optimization policy, where the third optimization policy restores the hardware configuration that was modified by the second optimization policy.

Example 9 is at least one non-transitory computer-readable medium comprising one or more instructions that when executed by a processor, cause the processor to: identify operating system workload demands; and apply, based on a determination that operating system workload demands are high, an optimization policy that modifies a security application, wherein the optimization policy modification includes removing a protection applied by the security application.

Example 10 may include the subject matter of Example 9, and may further specify that the optimization policy is a first optimization policy, and may further include one or more instructions that when executed by a processor, cause the processor to: identify a change in operating system workload demands; apply, based on a determination that operating system workload demands are low, a second optimization policy that modifies the security application, wherein the second optimization policy modification includes restoring the protection applied by the security application that was removed by the first optimization policy.

Example 11 may include the subject matter of Examples 9 or 10, and may further include one or more instructions that when executed by a processor, cause the processor to: monitor the optimization policy modification; collect performance data associated with the optimization policy modification; and send, to a cloud server, the performance data for analysis to determine whether the operating system achieved a threshold performance while the optimization policy was applied.

Example 12 may include the subject matter of any of Examples 9-11, and may further specify that removing a protection applied by the security application includes disabling one or more real-time security scanners, preventing new virus definition sets from downloading, or disabling security application updates.

Example 13 may include the subject matter of any of Examples 9-12, and may further specify that the optimization policy is a first optimization policy, and may further include one or more instructions that when executed by a processor, cause the processor to: apply a second optimization policy that modifies a hardware configuration.

Example 14 may include the subject matter of Example 13, and may further include one or more instructions that when executed by a processor, cause the processor to: monitor the impact of the hardware modification.

Example 15 may include the subject matter of Example 14, and may further include one or more instructions that when executed by a processor, cause the processor to: determine whether the impact of the hardware modification requires the second optimization policy to be changed; and apply, based on a determination that the impact of the hardware modification requires that the second optimization policy be changed, a third optimization policy, where the third optimization policy restores the hardware configuration that was modified by the second optimization policy.

Example 16 may include the subject matter of Example 13, and may further specify that the hardware modification includes overclocking a processor speed or reprioritizing access to network bandwidth.

Example 17 is a method, including: receiving, from an electronic device, a software configuration and a hardware configuration of the electronic device, wherein the software configuration includes a security application and a high-demand application; developing an optimization policy to improve performance of the high-demand application, wherein the optimization policy modifies a configuration of the security application; sending the optimization policy to the electronic device for implementation; receiving, from the electronic device, performance data collected during implementation of the optimization policy; determining whether the optimization policy improved performance of the high-demand application; and developing, based on a determination that the optimization policy did not improve performance of the high-demand application, an updated optimization policy, wherein the updated optimization policy is developed based on the performance data.

Example 18 may include the subject matter of Example 17, and may further specify that determining whether the optimization policy improved performance of the high-demand application includes comparing the performance data to predefined performance metrics.

Example 19 may include the subject matter of Example 17 or 18, and may further specify that the electronic device is a first electronic device and the high-demand application is a first high-demand application, and the method and may further include: receiving, from a second electronic device, a software configuration and a hardware configuration of the second electronic device, wherein the software configuration includes the security application and a second high-demand application; sending the optimization policy to the second electronic device for implementation; receiving, from the second electronic device, performance data collected during implementation of the optimization policy; and wherein the updated optimization policy is developed based on the performance data from the first and second electronic devices.

Example 20 may include the subject matter of any of Examples 17-19, and may further specify that the optimization policy further modifies a hardware configuration of the electronic device.

The invention claimed is:
1. An apparatus, comprising:
a memory element operable to store instructions; and
a processor operable to execute the instructions, such that the apparatus is configured to
determine whether a high-demand application is running based on detecting that operating system workload demands are high;
apply, based on a determination that a high-demand application is running, an optimization policy that modifies a security application, wherein the optimization policy modification includes reducing a protection applied by the security application, and the optimization policy is a first optimization policy; and apply a second optimization policy that modifies a hardware configuration.

2. The apparatus of claim 1, wherein the apparatus is further configured to:
- determine, based on operating system workload demands, that the high-demand application is not running; and
- apply, based on a determination that the high-demand application is not running, a security policy that modifies the security application, and the security policy modification includes restoring the protection applied by the security application that was reduced by the first optimization policy.

3. The apparatus of claim 1, further configured to:
- monitor the optimization policy modification;
- collect performance data associated with the optimization policy modification; and
- send, to a cloud server, the performance data for analysis to determine whether the operating system achieved a threshold performance while the optimization policy was applied.

4. The apparatus of claim 1, wherein reducing a protection applied by the security application includes disabling one or more real-time security scanners, preventing new virus definition sets from downloading, or disabling security application updates.

5. The apparatus of claim 1, wherein the hardware modification includes overclocking a processor speed or allocating, to the high-demand application, priority access to network bandwidth.

6. The apparatus of claim 1, further configured to:
- monitor the impact of the hardware modification, wherein monitoring the impact includes monitoring a temperature of the processor or monitoring a utilization of network bandwidth.

7. The apparatus of claim 6, further configured to:
- determine whether the impact of the hardware modification requires the second optimization policy to be changed; and
- apply, based on a determination that the impact of the hardware modification requires that the second optimization policy be changed, a third optimization policy, where the third optimization policy restores the hardware configuration that was modified by the second optimization policy.

8. At least one non-transitory, computer-readable medium including one or more instructions that, when executed by a processor, cause the processor to perform a method comprising:
- identifying operating system workload demands;
- determining whether operating system workload demands are high;
- applying, based on a determination that operating system workload demands are high based on a high-demand application, an optimization policy that modifies a security application, wherein the optimization policy modification includes removing a protection applied by the security application, and the optimization policy is a first optimization policy; and
- applying a second optimization policy that modifies a hardware configuration.

9. The at least one non-transitory, computer-readable medium of claim 8, the method further comprising:
- identifying a change in operating system workload demands; and
- applying, based on a determination that operating system workload demands are low, a security policy that modifies the security application, wherein the security policy modification includes restoring the protection applied by the security application that was removed by the first optimization policy.

10. The at least one non-transitory, computer-readable medium of claim 8, the method further comprising:
- monitoring the optimization policy modification;
- collecting performance data associated with the optimization policy modification; and
- sending, to a cloud server, the performance data for analysis to determine whether the operating system achieved a threshold performance while the optimization policy was applied.

11. The at least one non-transitory, computer-readable medium of claim 8, wherein removing a protection applied by the security application includes disabling one or more real-time security scanners, preventing new virus definition sets from downloading, or disabling security application updates.

12. The at least one non-transitory computer-readable medium of claim 8, the method further comprising:
- monitoring the impact of the hardware modification.

13. The at least one non-transitory computer-readable medium of claim 12, the method further comprising:
- determining whether the impact of the hardware modification requires the second optimization policy to be changed; and
- applying, based on a determination that the impact of the hardware modification requires that the second optimization policy be changed, a third optimization policy, where the third optimization policy restores the hardware configuration that was modified by the second optimization policy.

14. The at least one non-transitory, computer-readable medium of claim 8, wherein the hardware modification includes overclocking a processor speed or reprioritizing access to network bandwidth.

15. A method, comprising:
- receiving, from an electronic device, a software configuration and a hardware configuration of the electronic device, wherein the software configuration includes a security application and a high-demand application;
- developing an optimization policy to improve performance of the high-demand application, wherein the optimization policy modifies a configuration of the security application;
- sending the optimization policy to the electronic device for implementation;
- receiving, from the electronic device, performance data collected during implementation of the optimization policy;
- determining whether the optimization policy improved performance of the high-demand application; and
- developing, based on a determination that the optimization policy did not improve performance of the high-demand application, an updated optimization policy, wherein the updated optimization policy is developed based on the performance data.

16. The method of claim 15, wherein determining whether the optimization policy improved performance of the high-demand application includes comparing the performance data to predefined performance metrics.

17. The method of claim 15, wherein the electronic device is a first electronic device, the high-demand application is a first high-demand application, the method further comprising:
- receiving, from a second electronic device, a software configuration and a hardware configuration of the second electronic device, wherein the software configuration includes the security application and a second high-demand application;
sending the optimization policy to the second electronic device for implementation; and
receiving, from the second electronic device, performance data collected during implementation of the optimization policy; and
the updated optimization policy is developed based on the performance data from the first and second electronic devices.

18. The method of claim 15, wherein the optimization policy further modifies a hardware configuration of the electronic device.

\* \* \* \* \*